United States Patent

[11] 3,601,376

[72] Inventor Gerhard Niemitz
 Bronx, N.Y.
[21] Appl. No. 43,406
[22] Filed June 4, 1970
[45] Patented Aug. 24, 1971
[73] Assignee Kennedy Van Saun Corporation
 Danville, Pa.

[54] PROCESS AND APPARATUS FOR PREHEATING LIMESTONE AND THE LIKE
 10 Claims, 1 Drawing Fig.

[52] U.S. Cl. ............................................ 263/30, 263/53
[51] Int. Cl. ............................................ F27b 1/10
[50] Field of Search ............................................ 263/29, 30, 53

[56] References Cited
UNITED STATES PATENTS
3,171,795 3/1965 Fagnant........................ 263/30 X
3,397,460 8/1968 Hall............................. 263/29 X Primary Examiner—John J. Camby
Attorney—Pennie, Edmonds, Morton, Taylor and Adams ABSTRACT: Apparatus for preheating limestone comprising an upright structure including a storage bin at the top, a horizontal bridge and arch structure extending through the central lower portion of the preheater, the upper walls of which slope outwardly, inwardly extending plates directing limestone from the side walls toward the bridge structure and covering a gas receiving space and gas outlets, duct means for introducing hot gases beneath the arch to pass through the stone moving downwardly over the bridge structure onto a sloping floor at each side, means for moving stone along each sloping floor into a discharge passage, a baffle wall extending along at each side of the bridge structure under the plates for dividing the gases leaving the preheating zone, and valve control means in a gas passage outside the baffle wall for varying the flow of gases removed after passing through only a portion of the stone in preheating zone.

PATENTED AUG 24 1971 3,601,376
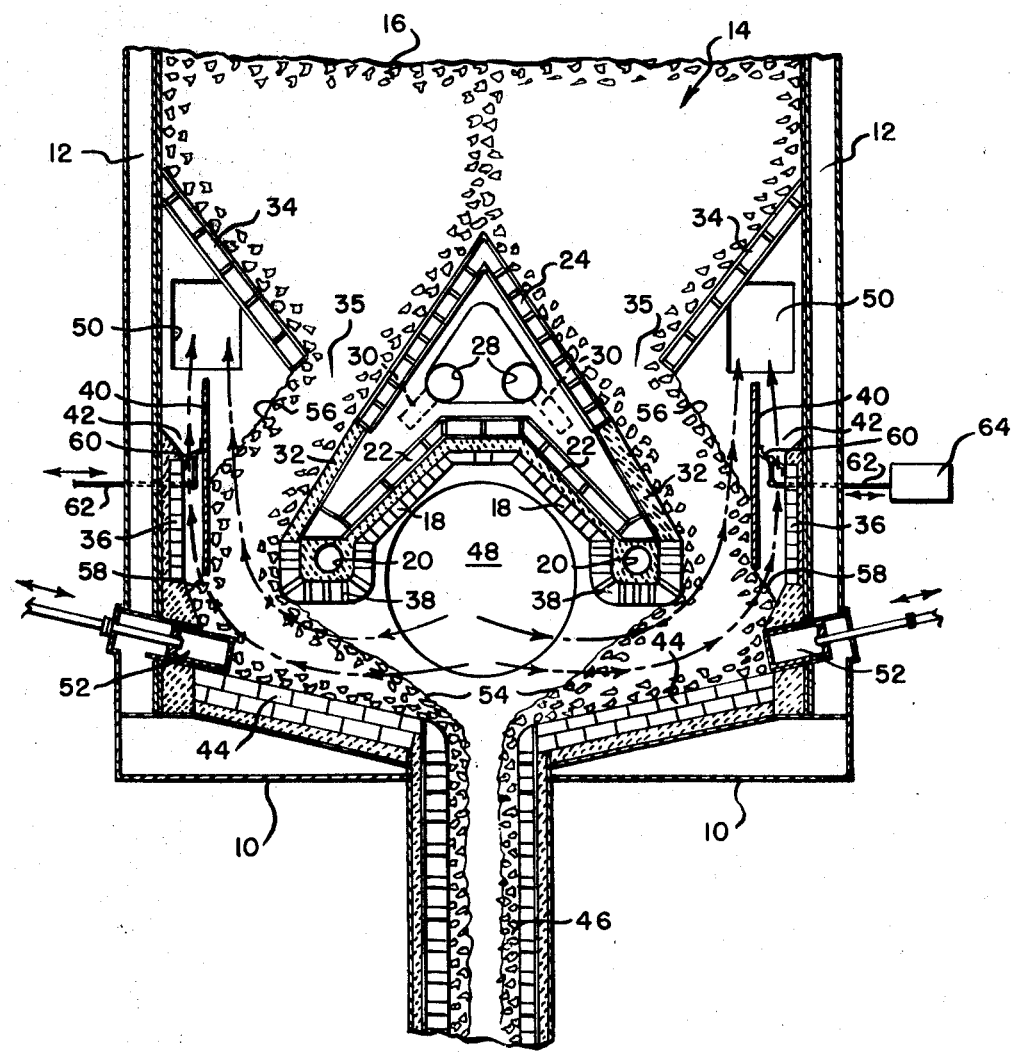
INVENTOR
Gerhard Niemitz
BY
Pennie, Edmonds, Morton, Taylor & Adams
ATTORNEYS 3,601,376

PROCESS AND APPARATUS FOR PREHEATING LIMESTONE AND THE LIKE

BACKGROUND OF THE INVENTION

1. Field of the Invention

This invention comprises improvements in processes for preheating limestone with hot kiln gases and apparatus therefor.

2. Description of the Prior Art

The prior art discloses in general some of the features disclosed in the present application and attention is directed to U.S. Pat. No. 2,799,489 disclosing a gas bypass from a kiln to a preheater, U.S. Pat. No. 3,284,072 disclosing pusher feeders for moving preheated material along a sloping floor which terminates in an upwardly directed ledge, and U.S. Pat. No. 3,345,052 disclosing a preheater discharging directly through a discharge passageway into a calcining kiln from which hot gases are delivered to the preheater in a bypass separate from said passageway.

The primary object of this invention is to avoid some of the disadvantage of prior structure and procedures and to improve on the use of certain known features. Another object is to provide a control system which takes into account the fact that crushed limestone may vary considerably in porosity particularly in a body moving downwardly through a direct contact preheating zone. Provision is therefore made for varying the amount of gas contacting the stone in the preheated stone.

SUMMARY OF THE INVENTION

The improvements contemplated by the present invention relate primarily to the control of the limestone preheating operation as carried out in an upright preheater wherein the limestone is passed through a preheating zone while a body thereof rests on a downwardly sloping floor. Provision is made for dividing the gases passing through the limestone in the preheating zone so that a first portion of the gases pass completely through the limestone in the preheating zone whereas a second portion of the gases is taken off after they pass through only a portion of the preheating zone. The flow of the second portion is controlled so as to modify the preheating operation in accordance with the fineness of the crushed limestone so that the greater the porosity of the body of stone in the preheating the less the flow in the second portion.

The apparatus for carrying out the improved method comprises an upright heating tower provided with a horizontal bridge and arch structure spaced above the bottom sloping floors at the respective sides, plate means extending from the respective sides of the preheater toward the bridge structure so as to provide a gas space therebeneath for receiving hot gas after passing through the preheating zone. Furthermore, a baffle wall is provided at each side between the bridge structure and the sidewall of the preheater. This baffle wall extends down into the preheating zone so that gases may be drawn off without passing completely through the zone. These baffle walls extend through the preheater parallel to the bridge structure and the gas flow spaces outside the baffle walls are controlled by valves.

The preheating is effectively promoted by providing a sloping floor at each side which continues to a central discharge outlet. Crushed stone is pushed along the floor on each side to its rim at the discharge so that there is no packing on the floor below the bridge structure. Means is provided for introducing hot gases which have bypassed the stone discharge outlet directly under the arch of the bridge structure.

BRIEF DESCRIPTION OF THE DRAWING

The single figure of the drawing is a diagrammatic transverse vertical sectional view of an apparatus constructed in accordance with the invention and particularly adapted for use in carrying out the improved process.

DESCRIPTION OF THE PREFERRED EMBODIMENTS

The limestone preheating apparatus illustrated in the drawing comprises an upright rectangularly shaped structure in cross section, made up of a welded steel framework lined with refractory materials in the areas of high temperature. The steel framework as shown includes a base 10 and sidewalls 12 lined with sheet steel to provide a storage bin section 14. The inside of one of the two end walls is shown at 16.

The preheating section comprises a refractory brick arch 18 supported by spaced horizontal steel beams 20 which in turn are each supported on spaced steel posts, not shown, resting on the base 10 and protected by fire brick. The arch 18 extends from end-to-end of the preheater and the brick are carried by a steel support 22 the sides of which rest respectively on the beams 20 as shown. An inverted V-shaped steel bridge 24 extends in spaced relation over the support 22 with its sides connected thereto at the support beams 20. Spaced cutout partitions 26 separate the bridge 24 from the support 22 and there is provided a cooling air space extending from end-to-end of the preheater, supplied with cooling air by ducts 28 provided with spaced branch air discharge branches 30. Air is forced into one end of the ducts 28 for cooling the arch 18, the elements 22 and 24 and refractory material 32 on the lower portions of the bridge 24. Heated cooling air may be discharged through an end outlet or outlets, not shown. Each sidewall 12, opposite the upper portion of the bridge 24 carries a steel cover plate structure 34 extending downwardly and inwardly to a position spaced, as shown, from the respective sides of the bridge 24 to provide a stone flow space 35. The cover plates 34 and the upper side portions of the bridge 24 are above the preheating zones and are not protected with refractory material, but the lower portions of the sidewalls 12 are covered with refractory material 36, and refractory brick 38 surround the supports 20, extending from the arch 18 respectively to the refractory layers 32.

When the stone storage bin 14 is loaded with crushed limestone it flows downwardly along the sloping surfaces of the cover plates 34 and of the bridge 24, through the flow spaces 35 and against side metal baffle plates 40, extending from end-to-end of the preheater to provide hot gas bypass passageways 42 respectively between the baffles and the refractory sidewalls 36.

At each side crushed stone flows between the baffle 40 and refractory brick elements 38 onto a downwardly and inwardly sloping refractory brick floor 44 terminating in a rim from which it is discharged into a chute 46 leading to the inlet of a rotary or other type lime kiln.

High temperature kiln gases discharged from the kiln and bypassing the chute 46 are introduced into the preheater under the arch 18 through a large inlet 48, in the end wall 16. The hot gases flow along under the arch 18, through the crushed stone at each side on the floor 44 and upwardly through the crushed stone thereabove to discharge into the spaces under the cover plates 34 and from the preheater through large outlets 50 in the end wall 16.

A number of plunger feeders 52 are located along each side of the preheater at the slope of the floor 44, one of which is shown. The plungers 52 at one side alternate in operation with those on the opposite side thereby obtaining uniform material feed of stone through the bed in the preheater. By sloping the bottoms or floors 44 and the plunger feeders 52 at the same angle, and continuing the floor slope right out to its rim, bulging and stone packing is avoided between the floor and brickwork 38 thereabove, in contract to that occurring where feeders act on stone on a horizontal floor or one provided with an upwardly directed ledge at its discharge rim for holding the stone back.

It has been found that with floors like these the crushed stone packs to about twelve inches high and moves as a nearly solid layer out to the dropoff rim, thereby reducing the effective flow area for hot gas by as much as fifty percent. In contrast, the arrangement provided in the present preheater gives a large flow area along the surface line 54 resulting in reduced pressure drop through the unit and less fan power consumption in drawing gases taken from the outlets 50. More efficient and better preheating is thus obtained.

With the structure and operation provided by the baffle wall 40 the stone slope at 56 is higher than usual to provide a longer preheating zone from the slope line 54 than would normally be used. However, the stone slope at 58 from the lower edge of the baffle wall 40 is in the midportion of the preheating zone so that it is possible to bypass a quantity of the preheating gas, the rate of flow of which is controlled by a valve or damper 60, as shown at each side of the preheater. The dampers extend from end-to-end of the preheater along the baffle walls and each may be actuated by a rod or rods 62, as shown at the right, from a control 64, which may be operated manually or automatically according to the gas pressure drop from the inlet 48 to the outlets 50, respectively.

The dampers 60 may also be connected through the controls to respond to variations in the preheat temperature of the stone at the discharge rim of the floors 44. If this temperature tends to rise too high or go too low the respective damper may be opened or closed more to change the rate of bypass gas flow. In general the heat contained in the inlet gases from the kiln is considerably larger in quantity then necessary for simple preheating, without chemical decomposition of the stone, and it is therefore advantageous to bypass a portion of the gas by the use of the dampers 60, and only use the amount exactly necessary for preheating and drying of the stone. The stone may be preheated to a temperature of about 1550° F.

At each side of the preheater the sloping floor 44 gives a large gas contact area 54 from its rim to the outer portion of the brickwork edge 38, which cooperates with the baffle wall 40 and damper 60 to result in effective preheating and its control. The baffle wall 40 preferably extends down to a position so that its lower edge is opposite the edge of the bridge structure, as shown. In a commercial unit the brick work 38 is about 30 inches above the floor 44. This gives an idea of the dimensional relationships in the unit as illustrated. In addition the diameter of the hot gas inlet 48 is 5 feet in a commercial installation.

It is to be understood that the process and apparatus of the present invention may be employed in the preheating of other crushed stone materials than limestone and that the control features are readily applicable to various sizes of crushed stone as encountered in present commercial operations.

I claim:

1. In a process for preheating limestone by contact with high temperature hot gases as a body of limestone moves downwardly through a preheating zone, the steps comprising passing the gases from contact with the body of limestone into a space overlying the body of limestone, controlling the preheating operation in the preheating zone by passing a first portion of the gases completely through the preheating zone and a second portion through only a portion of the preheating zone, and controlling the preheating operation by varying said second portion.

2. A process as claimed in claim 1, wherein the body of limestone is supported on a continuously downwardly sloping floor to a rim, moving limestone of the body along said floor to a stone discharge at said rim and passing the hot gases initially into the limestone on said floor.

3. A process as claimed in claim 1, the step of withdrawing said second portion of the preheating gas from an intermediate location in the preheating zone.

4. A process as claimed in claim 1, the step of varying the portion of the second portion in accordance with the porosity of the body of limestone in the preheating zone.

5. A process as claimed in claim 1, wherein crushed limestone is advanced downwardly through the preheating zone, passing said first portion into said space from the upper part of said zone, withdrawing said second portion from an intermediate position of the preheating zone and passing it through a bypass passageway into said space overlying the body of limestone in the preheating zone.

6. In a stone preheater including an upright structure having side and end walls and a floor, a downwardly and outwardly sloping wall for the passage of stone, a stone slide wall sloping downwardly and inwardly from a side wall toward but spaced from the outwardly sloping wall, an inlet for hot gases below the outwardly-sloping wall, an outlet for gases below the stone slide, said outwardly sloping wall, the stone slide, said sidewall and the floor defining a preheating zone, means for directing a first portion of the hot gases completely through the preheating zone, means for bypassing a second portion of the hot gases from the preheating zone after passage through only a portion of the preheating zone, and means for varying the quantity of the second portion.

7. A stone preheater as claimed in claim 6, wherein the directing means comprises a baffle wall located below the stone slide and extending into the preheating zone in spaced generally parallel relation to said sidewall.

8. A stone preheater as claimed in claim 7, wherein said baffle and sidewalls define said bypassing means, and means for controlling the gas flow in the bypass passageway between said baffle and sidewalls.

9. A stone preheater as claimed in claim 6, comprising a central bridge defining downwardly and outwardly sloping walls terminating in spaced relation to the floor, the bridge defining an arch over the hot gas inlet, a stone discharge passage below the arch, and a floor section sloping continuously downwardly from said sidewall to a rim at said discharge passage.

10. A stone preheater as claimed in claim 7, wherein the baffle wall extends from a position opposite the lower portion of the outwardly and downwardly sloping wall to a position beneath the inwardly sloping wall and below the gas outlet, and a flow control damper in the space between the baffle and sidewalls.